Aug. 2, 1938.   L. V. SMITH   2,125,523
CONSTRUCTION FOR DEVICES MADE OF FLEXIBLE TRANSPARENT MATERIAL
Filed Dec. 4, 1936
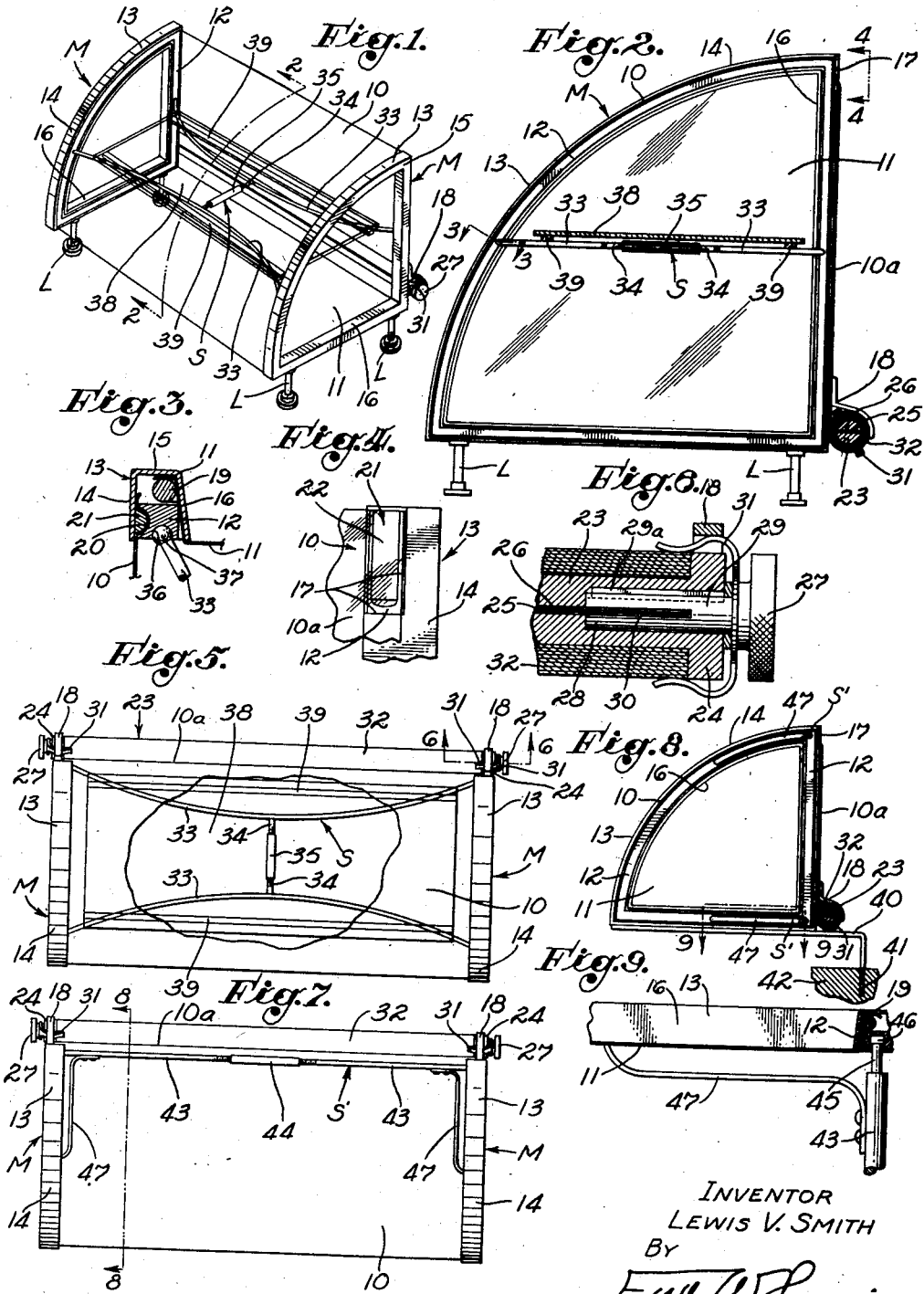
INVENTOR
LEWIS V. SMITH
BY
ATTORNEY.

Patented Aug. 2, 1938

2,125,523

UNITED STATES PATENT OFFICE 2,125,523

CONSTRUCTION FOR DEVICES MADE OF FLEXIBLE TRANSPARENT MATERIAL

Lewis V. Smith, Los Angeles, Calif.

Application December 4, 1936, Serial No. 114,160

17 Claims. (Cl. 312—114)

My invention relates to devices incorporating sheets of flexible transparent material, particularly such devices in which the flexible sheets are employed as wall members. My invention is especially applicable to the construction of display cases, and for the purpose of this disclosure it will be described as so applied. It is to be understood, however, that the invention is not limited to display cases.

The usual display case has a permanently erected frame and walls of glass. Such display cases are costly, expensive to repair, fragile, heavy, and may not readily be dismantled for shipment.

A primary object of my invention is to provide a frame that may be used with light transparent, flexible sheet material, such as Cellophane and the like, to produce a new type of display case to be used for the same purposes as the usual display case and also to be used in new fields of application for display cases. Many articles on display that should be protected from dust and contamination are not so protected because glass display cases of the usual type are too costly for a particular purpose, or are too heavy for a particular location, or cost too much to repair when exposed to breakage hazards.

An object of my invention is to meet these various difficulties by providing an inexpensive lightweight display case of non-shattering material constructed for exceptionally convenient repair or replacement of parts. These features open up several new fields of application. For example, light weight, inexpensive display cases, constructed in accordance with my disclosure, may be used extensively for the protection of material now displayed on open shelves.

One of the objects of my invention is to employ the transparent flexible sheet as a tension member for a structural purpose, thereby reducing the number of rigid frame members required, with resultant reduction in weight and resultant elimination of concealed spaces.

A further object of my invention is to reduce the frame members in one dimension of such a structure to a single spreader-means and to utilize that spreader as a rack for supporting articles or as a base for a shelf.

The transportation of a display case having the usual unitary rigid frame and walls of glass is expensive and involves several problems, such display cases being heavy, bulky and susceptible to breakage by even ordinary jars. A further object of my invention is to provide a display case that may be readily dismantled into compact form for shipment and when so dismantled will be substantially immune to breakage by even severe handling. For this purpose, as well as for facilitating repair and replacement of parts, it is desirable that the frame construction be such that the flexible sheets may be releasably engaged thereby in an efficient manner; the provision of such sheet-engaging means being a further object of my invention.

The above and additional objects and advantages of my invention will be apparent in my following detailed description:

Broadly described, my invention comprises a display case construction in which two end walls are connected by a body sheet of flexible transparent material and are acted upon by a spreader to place the body sheet under tension, the various elements being constructed and arranged to provide a substantially rigid combination.

In the following drawing, showing by example how the principles of my invention may be applied, Fig. 1 is a perspective view of the preferred form of my display case;

Fig. 2 is an enlarged cross-section taken as indicated by the line 2—2 of Fig. 1;

Fig. 3 is a greatly enlarged fragmentary section taken as indicated by the broken line 3—3 of Fig. 2;

Fig. 4 is a fragmentary view, greatly enlarged, taken as indicated by the line 4—4 of Fig. 2;

Fig. 5 is a plan view of the display case illustrated in Fig. 1;

Fig. 6 is a greatly enlarged fragmentary section taken as indicated by the line 6—6 of Fig. 5.

Fig. 7 is a plan view of a second form of my invention.

Fig. 8 is a section taken as indicated by the line 8—8 of Fig. 7; and

Fig. 9 is a fragmentary horizontal section taken as indicated by the line 9—9 of Fig. 8.

In the display case construction illustrated in Figs. 1 to 6, spreader means S exerting force between end members M places under tension a body sheet 10 of Cellophane or like material that interconnects said two end members.

By virtue of this structural combination, skinstress in the body sheet cooperates with the frame members to provide rigidity that is usually achieved solely by the use of frame members, and certain frame members usually regarded as indispensable to such structures may, therefore, be entirely omitted. In fact, in one dimension the display case may have only one structural member besides the body sheet, namely, a single spreader acting between opposite walls of the case.

It will be apparent that the cross-sectional dimensions and shape of the display case will be determined by the two end members, and the length of the display case and the angular relation of one end member to the other will be determined by the length and cut of the body sheet. The display case of the drawing is somewhat triangular in cross-section having a vertical back, a horizontal bottom, and a curved wall for the front and top, and the two end members are vertical, making the display case rectangular in longitudinal section; but it is obvious that the same principles of construction may be embodied in display cases of other cross-sectional configurations.

The body sheet 10 and end sheets 11 of similar material may be attached to the end members in any efficient manner. In the preferred form of my invention, however, the sheets are detachably secured to the end members so that the display case may be readily dismantled and assembled, or parts may be readily replaced when damaged. A convenient construction for releasably securing the sheets and also for concealing the edges of the sheets may be had by arranging each end member to comprise two separable complementary end frames, for example, an inner frame 12 and an outer frame 13.

The outer frame may be channel-shaped in cross-section as shown in Fig. 3 with the two legs of the channel slightly diverging. Preferably the outer flange 14 of the channel will be perpendicular to web 15 and the inner flange 16 will be inclined away from the outer flange. The outer flange 14 of the channel frame is preferably cut away to make a recess 17 at the rear near the top of the case to permit the body sheet to pass from one side of the web 15 to the other. Suitable retaining means such as a clip 18 may be mounted on the frame 13 at the back near the bottom to cooperate with means for closing the back of the case, as will be described hereinafter. If it is desired that the display case be equipped with means to support it in spaced relation to a horizontal surface, supporting legs L may likewise be fixed to the outer frame 13.

The end sheets 11 may be secured to either of the two frame members 12 and 13 and in any suitable manner. Fig. 3 shows the margin of an end sheet engaged between the inner flange 16 of the channel frame 13 and a complementary wire 19, the wire wedging against the flange.

The body sheet 10 may likewise be attached to either frame member. In the drawing, the inner frame 12 is a solid member substantially rectangular in configuration with a longitudinal groove 20 of arcuate cross-section extending along its outer face, the edges of the body sheet 10 being secured between the groove and a clamp member 21 having a shape complementary to the groove. This clamp member nests into the groove 20 along the bottom, front and top of the inner frame 12, and since, in the preferred form of my invention, the body sheet is not secured to the end members at the back of the display case, this clamp means may terminate in short bent-over ends 22 engaging the back of the frame 12 at the top and bottom respectively (see Fig. 4). It is apparent that if this clamp is of resilient material it may be readily sprung for assembly or disassembly of the display case. Since the channel frame 13 fits over and receives the inner frame 12 in my preferred construction, the two frames may be so arranged that the inner frame wedges into place, thereby pressing the clamp 21 against the inner frame to increase the efficiency of engagement with the body sheet, as may be understood by referring to Fig. 3.

The back of the display case may be left open where the sole purpose of the case is to make its contents inaccessible from the front, or the back of the display case may be provided with any suitable closure when it is desirable to completely enclose its contents.

In the preferred form of my invention, the body sheet 10 passes through the recesses 17 of the outer frame 13 and extends as a curtain 10a over the back of the display case, this curtain normally being releasably held against the end members M of the case. For such purpose, the bottom edge of the curtain 10a may be adjustably engaged by a suitable roller 23 having annular end flanges 24. The roller has a diametrical slot 25 to receive the end portion 26 of the body sheet 10. The opposite ends of the roller are provided with knurled knobs 27 having axial stems 29 slidingly extending into the ends of the roller and prevented from rotation relative thereto by suitable keys 29a. These stems have slots 30 registering with the slot 25 of the roller. Rotatably mounted on each of the knobs 27 is a suitable yielding clamp 31 so positioned as to clamp the rolled portion 32 of the curtain when the knob is moved inward, as shown in Fig. 6, the clamps moving free of the curtain when the knobs are moved outward. When the curtain is suitably rolled and secured by the clamps 31, the rolled lower end of the curtain may be releasably engaged by the clips 18 as indicated by Fig. 2.

The spreader for exerting force between the two end members may be any form of yieldingly extensile means. The spreader shown in Figs. 1, 2, 3 and 5 is constructed on the toggle principle, having two flexible bows 33, each of which has an integral lateral extension 34 threaded for engagement by a suitable turnbuckle 35, the threads being disposed so that rotation of the turnbuckle will either force the bows apart or draw them together. The ends of the bows are releasably engaged by suitable complementary recesses 36 in the frame members 12. Preferably the ends of the bows terminate in balls 37 and the recesses are complementary sockets, thereby providing ball and socket joints.

The manner in which the display case may be assembled will be clear from the above description. The end sheets will first be secured to the respective outer frames 13 by means of the wires 19. As each wire is forced inward along the inclined surface of the inner flange 16 of the frame, it will tend to pull the corresponding sheet 11 suitably taut to provide a plain surface free of wrinkles.

One edge of the body sheet 10 is then stretched laterally with suitable tension around the bottom, front and top of the inner frame 12 and is temporarily secured thereto by applying clamp 21 in a manner to retain the desired lateral tension in the sheet. The opposite edge of the sheet is similarly assembled to the second inner frame 12, and then the outer frames 13 are slipped over the inner frames 12, thereby making the engagement with the body sheet positive. At this juncture in the process of assembly, the combination is unstable. The ball ends 37 of the spreader bows 33 are next seated in their corresponding sockets 36 in the frames 12, the turnbuckle 35 having been previously rotated to draw the bows 33 toward each other sufficiently to provide the required clearance. After the ends of the bows are seated, the turnbuckle is rotated in the direction to force the bows apart, thereby increasing the effective length of the spreader. This action forces the two end members apart until sufficient tension is exerted through the body sheet to make the structure stable and satisfactorily rigid.

Finally, the free end of the body sheet is inserted in the slot of the roller 23, the knobs 27 being pulled outward. The end of the curtain is rolled up sufficiently to make snug engagement with the clips 18 and then the knobs 27 are moved inward to place the roller clamps 31 in effective positions. The rolled bottom of the curtain is then engaged with clips 18 to be held snug against the back edges of the frames 13 to provide a substantially dust-proof closure.

The yielding clamps 31 associated with the knobs 27 control the effective length of the curtain. The operation of opening the curtain for access to the interior of the display case consists in pulling the two knobs 27 outward, thereby withdrawing the clamps 31 to permit the unrolling of the curtain sufficiently for the rolled portion thereof to clear the clips 18. The two knobs are then pushed inward to prevent further unrolling and the curtain is swung outward from the case. The curtain is restored to its closed position by the reverse sequence of these operations.

I have found that a Cellophane sheet held in tension by frame members as taught by the present disclosure will not only serve to lend rigidity to the display case but will also be adequate to support relatively heavy articles for display on the bottom or floor of the display case. I have also found that the spreader S may serve as a convenient hanger for items being displayed, or may be used to support a horizontally disposed shelf 38, the shelf resting on the bows 33 and clearing the turnbuckle 35 by virtue of suitable longitudinal strips 39 on the undersurface of the shelf. Preferably, such a shelf will be made of glass.

With the curtain ignored since it carries no structural stress, it is apparent that since the body sheet is arranged as two non-parallel walls with the spreader acting between those walls, a stable and adequately rigid display case construction is achieved. Compressive stresses in the spreader are in equilibrium with tensile stresses in the body sheet and since there are no redundant members in such a combination, the structure is statically determinate. Without tension in the body sheet the frame would collapse. The body sheet then serves as a tension member cooperative with the frame members to complete the structural organization necessary for the rigidity and the stability of the assemblage.

An alternative embodiment of my invention is shown in Figs. 7 to 9, corresponding parts being designated by corresponding letters and numerals. One of the departures from the preferred form consists in substituting a bracket arm 40 attached to each end of the case in place of legs L, to provide an entirely clear space beneath the display case. Each bracket may, for example, be secured by screws 41 to the back of some support 42, such as a counter or show case.

The other departure from the preferred form is the elimination of the shelf 38 and the substitution of a pair of spreaders S' for the single spreader means S, one of the spreaders S' lying close to the top of the case, and the other spreader lying close to the bottom. Each spreader S' comprises two rods 43 secured together by oppositely disposed threads engaging a central turnbuckle 44. The rods have outer reduced ends 45 that slidingly extend in suitable bores 46 in the inner frames 12. Mounted on the rods 43 near their outer ends are suitable spring members 47, the ends of which seat in suitable recesses (not shown) also in the inner frame 12. These spring members conform to the configuration of the end members of the display case, the two lower spring members being straight and the two upper being curved as indicated in Fig. 8. By substitution of this second form of spreader-means, the interior of the display case is left entirely free, and the spreaders are inconspicuous by virtue of their locations with respect to the end members of the case.

The manner in which this second form may be assembled is similar to the process of assembling the first form and need not be described in detail. Each of the spreaders S' is inserted in turn, the spring members 47 first being seated in their corresponding recesses and then the rods 43, having been contracted previously by the turnbuckle 44, are aligned with the recesses 46 and then extended to engage the recess. Preferably, the spring members are so arranged as to exert the desired force before the ends 45 completely seat in the bores 46, such a relationship permitting a desirable degree of adjustment of the pressure exerted.

In a construction taught by this disclosure, the tensile strength of Cellophane is utilized to full advantage. The resulting display case is exceptionally light and may be constructed of relatively inexpensive materials. The case may be easily assembled or dismanted and any of the sheets may be entirely replaced if desired at exceptionally low cost. If desired, reserve sheet material may be carried by the roller 23. For storage or shipment the display case may be dismanteled, the sheets rolled up on the roller 23, and the frames laid flat together, thus minimizing space and reducing breakage hazard.

For the purpose of adequate disclosure and to illustrate the principles involved, I have described certain preferred forms of my invention in specific detail. Those forms suggest wide ranges of modification without departing from the essence of my invention, and I specifically reserve the right to all such changes and modifications that properly come within the purview of my appended claims.

I claim as my invention:

1. A display case or the like, having: two opposite walls; a sheet of flexible transparent material to form a further wall between said opposite walls; and means acting between said opposite walls to place the sheet under tension.

2. A display case of the class described, having: two opposite walls; a sheet of flexible transparent material connecting said walls to form walls in more than one plane for further sides of the display case; and spreader means acting between said opposite walls to complete the structural organization of the assemblage by placing said sheet under tension.

3. A display case of the class described, having: two end walls to determine the cross-sectional shape of the case; a body sheet of flexible transparent material to form connecting walls; means to releasably attach edges of said sheet to the end walls; and spreader means adapted to cooperate with said end walls to place said body sheet under tension, whereby the body sheet serves as means to complete the structural organization necessary for the rigidity of the assemblage.

4. In a display case or the like, means to provide rigidity, said means comprising: a flexible body sheet of transparent material; members engaging opposite edges of said sheet; and a spreader means acting between said members whereby compressive stress in the spreader will be in stable equilibrium with tensile stresses in more than one plane in the body sheet.

5. In a display case or the like, means to provide rigidity, said means comprising: a flexible body sheet of transparent material disposed in non-parallel planes; end members engaging opposite edges of said body sheet; and a spreader acting between said end members and between said planes to place said body sheet under tension, thereby causing the body sheet to serve as a tension member cooperative with said members and spreader to complete the structural organization necessary for the rigidity of the assemblage.

6. A display case or the like, having: a flexible body sheet of transparent material; members engaging opposite edges of said sheet; supporting means for the device associated with said members; and a spreader acting between said members to place said body sheet under tension to support articles between said members.

7. A display case of the class described, having: a flexible body sheet of transparent material; members engaging opposite edges of said sheet; and a spreader acting between said members to hold the body sheet under tension, said spreader being spaced substantially from the bottom edges of said end members to provide a convenient support for objects in the case.

8. A display case of the class described, having: a flexible body sheet of transparent material; members engaging opposite edges of said sheet; a spreader acting between said members to hold the body sheet under tension, said spreader extending in a substantially horizontal plane intermediate the top and bottom of the case; and a shelf supported by said spreader.

9. A display case of the class described, having: end members to determine the cross-sectional configuration of the case; a flexible body sheet; means to releasably secure end edges of the body sheet to said end members and to hold the sheet under lateral tension; and spreader means between the end members to place the body sheet under longitudinal tension.

10. A display case of the class described, having: a pair of end sheets of flexible material; a body sheet of flexible transparent material; end members to determine the cross-sectional configuration of the case; means to attach edges of the end sheets to said end members; means to releasably secure end edges of the body sheet to said end members to hold the body sheet under lateral tension; and spreader means between the end members to place the body sheet under longitudinal tension.

11. A display case of the class described, having: a body sheet; a pair of end sheets; a pair of rigid end frames; means to clamp edges of the body sheet to said end frames; a spreader acting between said end frames to place said body sheet under tension; and a pair of complementary end frames adapted to hold said end sheets and to engage with the corresponding first end frames, one of said frames being arranged to conceal the edges of the sheets.

12. A display case of the class described, having: a body sheet; two end sheets; a pair of rigid end members; a second pair of end members overlying the first pair; means to secure edges of the body sheet to one of said pairs of end members; means to secure edges of the end sheets to the other pair of end members; and spreader means acting between the end members that engage the body sheet to place said body sheet under tension.

13. A display case of the class described, having: a body sheet; two end sheets; a pair of rigid end members; a second pair of end members overlying the first pair, said end sheets being attached to one of said pairs of end members; means to secure the edges of the body sheet to the front and top edges of one of said pairs of end members; spreader means acting between the end members that engage the body sheet to place said body sheet under tension; and a closure at the back of said case.

14. A display case of the class described, having: a body sheet; two end sheets; a pair of rigid end frames; a second pair of frames overlying the first pair; means coacting with the second frames to releasably secure edges of the body sheet to at least the front and top edges of the first pair of end frames; a spreader acting between the first pair of end frames to place the body sheet under tension; means to secure edges of the end sheets to one pair of said end frames; and a closure at the back of the case.

15. In a display case or the like, the combination of: a sheet of flexible transparent material; means at two opposite edges of the sheet to hold the sheet in a desired configuration; and means acting on said holding means respectively in opposite directions to place said sheet under tension.

16. In a display case or the like, the combination of: a sheet of flexible transparent material; two members each at opposite edges of the sheet to hold the sheet in a desired configuration; and yielding means in compression between said members to place said sheet under tension.

17. A display case of the class described, having: a flexible body sheet of transparent material; two upright members engaging vertical and horizontal edges of said sheet at respectively opposite ends thereof; and a pair of spreaders acting between said members at upper and lower levels respectively to hold said body sheet under tension.

LEWIS V. SMITH.